US007689296B2

(12) United States Patent
Backstrom et al.

(10) Patent No.: US 7,689,296 B2
(45) Date of Patent: Mar. 30, 2010

(54) APPARATUS AND METHOD FOR CONTROLLING A PAPER MACHINE OR OTHER MACHINE USING MEASUREMENT PREDICTIONS BASED ON ASYNCHRONOUS SENSOR INFORMATION

(75) Inventors: Johan U. Backstrom, Vancouver (CA); Junqiang Fan, Vancouver (CA); Pengling He, New Westminister (CA); Gregory E. Stewart, Vancouver (CA)

(73) Assignee: Honeywell ASCA Inc., Ontario (CA)

( * ) Notice: Subject to any disclaimer, the term of this patent is extended or adjusted under 35 U.S.C. 154(b) by 970 days.

(21) Appl. No.: 11/413,524

(22) Filed: Apr. 28, 2006

(65) Prior Publication Data

US 2007/0255446 A1 Nov. 1, 2007

(51) Int. Cl.
*G05B 13/04* (2006.01)
(52) U.S. Cl. .............................. 700/31; 700/44; 700/29; 700/128
(58) Field of Classification Search .................... 700/31, 700/127, 128, 44, 45, 129, 29
See application file for complete search history.

(56) References Cited

U.S. PATENT DOCUMENTS

| 6,094,604 | A | 7/2000 | Bucher et al. |
| 6,807,510 | B1 | 10/2004 | Backstrom et al. |
| 2003/0000669 | A1* | 1/2003 | Strand et al. ............... 162/198 |
| 2005/0193739 | A1* | 9/2005 | Brunell et al. ............... 60/772 |
| 2007/0078530 | A1* | 4/2007 | Blevins et al. ............... 700/29 |

FOREIGN PATENT DOCUMENTS

| DE | 19913926 A1 | 9/2000 |
| WO | WO 03/096130 A1 | 11/2003 |

OTHER PUBLICATIONS

Katsuhiko Ogata, "Discrete-Time Control Systems", 2nd Edition, 1994, Prentice Hall, 11 pages.

* cited by examiner

*Primary Examiner*—Ramesh B Patel
*Assistant Examiner*—Steven R Garland
(74) *Attorney, Agent, or Firm*—Munck Carter, LLP

(57) ABSTRACT

A method includes predicting measurements or states to be used by a controller to control a process. The predicted measurements or states are generated using a model of the process. The method also includes providing the predicted measurements or states to the controller such that the controller uses the predicted measurements or states at a sampling rate of the controller. In addition, the method includes updating at least some of the predicted measurements or states using measurements associated with a characteristic of an item from a sensor. The model may represent a discrete time model, and the method may also include generating the discrete time model using a continuous time model of the process. The measurements could be received from a plurality of sensors, where at least two of the sensors have different sampling times.

24 Claims, 4 Drawing Sheets

APPARATUS AND METHOD FOR CONTROLLING A PAPER MACHINE OR OTHER MACHINE USING MEASUREMENT PREDICTIONS BASED ON ASYNCHRONOUS SENSOR INFORMATION

TECHNICAL FIELD

This disclosure relates generally to control systems and more specifically to an apparatus and method for controlling a paper machine or other machine using measurement predictions based on asynchronous sensor information.

BACKGROUND

Various systems are available and used to manufacture sheets of paper and other paper products. The sheets of paper being manufactured often have multiple characteristics that are monitored and controlled during the manufacturing process, such as dry weight, moisture, and caliper (thickness). The control of these or other sheet properties in a sheet-making machine is typically concerned with keeping the sheet properties as close as possible to target or desired values.

There are often two different types of actuators that are used to control the sheet properties in a sheet-making machine. First, there are machine direction (MD) actuators that typically affect only the cross direction average of a sheet property. The MD actuators often can have different dynamic responses with respect to a sheet property. Second, there are cross direction (CD) actuators that are typically arrayed across a sheet in the cross direction. Each array of CD actuators can usually affect both the average of a sheet property and the cross direction shape of the sheet property. The CD actuators often can have different dynamic responses and different spatial responses with respect to a sheet property.

The sheet properties are typically measured by a set of sensors scanned across the sheet in the CD direction by a scanner. A sheet property may also be measured by a stationary array of sensors. Many sheet-making machines have multiple scanners at different locations, and each scanner typically has its own set of sensors. The scanners are often not synchronized and can have very different scan times. In conventional CD control systems, synchronization of the sensors was not necessary since each CD controller was only concerned with controlling one sheet property measured by one set of sensors. The conventional CD controllers typically ignored the fact that one CD actuator could have an effect on multiple sheet properties. However, for multivariable CD controllers that implement coordinated control of multiple sheet properties, it is often required that the measurements of the sheet properties be synchronized.

SUMMARY

This disclosure provides an apparatus and method for controlling a paper machine or other machine using measurement predictions based on asynchronous sensor information.

In a first embodiment, a method includes predicting measurements or states to be used by a controller to control a process. The predicted measurements or states are generated using a model of the process. The method also includes providing the predicted measurements or states to the controller such that the controller uses the predicted measurements or states at a sampling rate of the controller. In addition, the method includes updating at least some of the predicted measurements or states using measurements associated with a characteristic of an item from a sensor.

In particular embodiments, the model represents a discrete time model, and the method also includes generating the discrete time model using a continuous time model of the process. In other particular embodiments, the measurements are received from a plurality of sensors, where at least two of the sensors have different sampling times. In yet other particular embodiments, a time interval between measurements output by the sensor is not an integer multiple of a time interval between outputs of the controller, and/or a time delay associated with the process is not an integer multiple of the time interval between outputs of the controller.

In a second embodiment, an apparatus includes at least one memory operable to store a model representing a process controlled by a controller. The apparatus also includes at least one processor operable to predict measurements or states to be used by the controller to control the process, where the predicted measurements or states are generated using the model. At least one processor is also operable to provide the predicted measurements or states to the controller such that the controller uses the predicted measurements or states at a sampling rate of the controller. In addition, at least one processor is operable to update at least some of the predicted measurements or states using measurements associated with a characteristic of an item from a sensor.

In a third embodiment, a computer program is embodied on a computer readable medium and is operable to be executed by a processor. The computer program includes computer readable program code for predicting measurements or states to be used by a controller to control a process, where the predicted measurements or states are generated using a model of the process. The computer program also includes computer readable program code for providing the predicted measurements or states to the controller such that the controller uses the predicted measurements or states at a sampling rate of the controller. In addition, the computer program includes computer readable program code for updating at least some of the predicted measurements or states using measurements associated with a characteristic of an item from a sensor.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
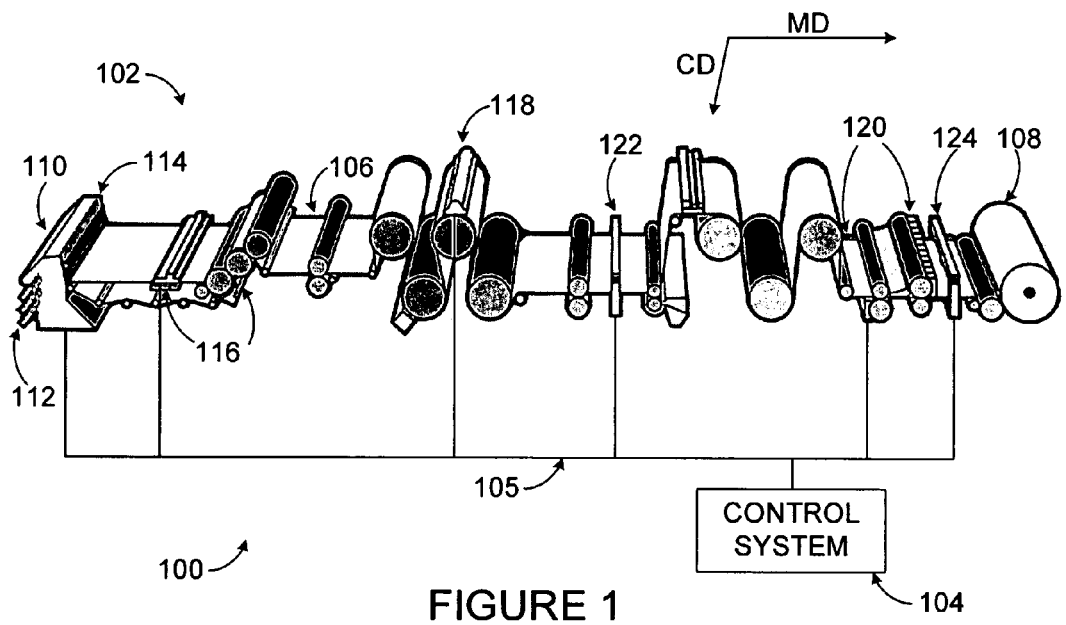
FIG. 1 illustrates an example paper production system according to one embodiment of this disclosure.

FIG. 1 illustrates an example paper production system 100 according to one embodiment of this disclosure. The embodiment of the paper production system 100 shown in FIG. 1 is for illustration only. Other embodiments of the paper production system 100 may be used without departing from the scope of this disclosure.

In this example, the paper production system 100 includes a paper machine 102, a control system 104, and a network 105. The paper machine 102 includes various components used to produce a paper product. In this example, the various components may be used to produce a paper sheet 106 collected at a reel 108. The control system 104 monitors and controls the operation of the paper machine 102. This may help to maintain or increase the quality of the paper sheets 106 produced by the paper machine 102.

As shown in FIG. 1, the paper machine 102 includes a headbox 110, which distributes a pulp suspension uniformly across the machine onto a continuous moving wire screen or mesh. The pulp suspension entering the headbox 110 may contain, for example, 0.2-3% wood fibres and/or other solids, with the remainder of the suspension being water. The headbox 110 may include an array of dilution actuators 112, which distributes dilution water into the pulp suspension across the sheet. The dilution water may be used to help ensure that the resulting paper sheet 106 has a more uniform basis weight across the sheet in the cross direction (CD). The headbox 110 may also include an array of slice lip actuators 114, which controls a slice opening across the machine from which the pulp suspension exits the headbox 110 onto the moving wire screen or mesh. The array of slice lip actuators 114 may also be used to control the CD basis weight of the paper sheet 106.

An array of steam actuators 116 produces hot steam that penetrates the paper sheet 106 and releases the latent heat in the steam into the paper sheet 106, thereby increasing the temperature of the paper sheet 106 in sections across the sheet. The increase in temperature may allow for easier cross direction removal of water from the paper sheet 106. An array of rewet shower actuators 118 adds small droplets of water (which may be air atomized) onto the surface of the paper sheet 106. The array of rewet shower actuators 118 may be used to control the moisture CD profile of the paper sheet 106, reduce or prevent over-drying of the paper sheet 106, or correct any dry streaks in the paper sheet 106. The paper sheet 106 is often passed through several nips of counter rotating rolls. An array of induction heating actuators 120 heats the shell surface of an iron roll across the machine. As the roll surface locally heats up, the roll diameter is locally expanded and hence increases nip pressure, which in turn locally compresses the paper sheet 106. The array of induction heating actuators 120 may therefore be used to control the caliper (thickness) CD profile of the paper sheet 106. Additional components could be used to further process the paper sheet 106, such as a supercalender for improving the paper sheet's thickness, smoothness, and gloss.

This represents a brief description of one type of paper machine 102 that may be used to produce a paper product. Additional details regarding this type of paper machine 102 are well-known in the art and are not needed for an understanding of this disclosure. Also, this represents one specific type of paper machine 102 that may be used in the system 100. Other machines or devices could be used that include any other or additional components for producing a paper product. In addition, this disclosure is not limited to use with systems for producing paper products and could be used with systems that produce other items or materials, such as plastic, textiles, metal foil or sheets, or other or additional materials.

In order to control the paper-making process, the properties of the paper sheet 106 may be constantly or repeatedly measured and the paper machine 102 adjusted to ensure sheet quality. This control may be achieved by measuring sheet properties at various stages in the manufacturing process. This information may then be used to adjust various actuators 112-120 within the paper machine 102 to compensate for any variations in the sheet properties from desired targets.

As shown in FIG. 1, the paper machine 102 includes two scanners 122-124, each of which may include a set of sensors. The scanners 122-124 are capable of scanning the paper sheet 106 and measuring one or more characteristics of the paper sheet 106. For example, the scanners 122-124 could carry sensors for measuring the weight, moisture, caliper (thickness), gloss, smoothness, or any other or additional characteristics of the paper sheet 106. Each of the scanners 122-124 includes any suitable structure or structures for measuring or detecting one or more characteristics of the paper sheet 106, such as sets or arrays of sensors. A scanning set of sensors represents one particular embodiment for measuring sheet properties. Other embodiments could include using stationary sets or arrays of sensors. Each of these embodiments may produce one or more arrays of measurements representing a CD profile. The cross direction (CD) in the system 100 is typically perpendicular to the machine direction (MD) in the system 100.

Figure 2:
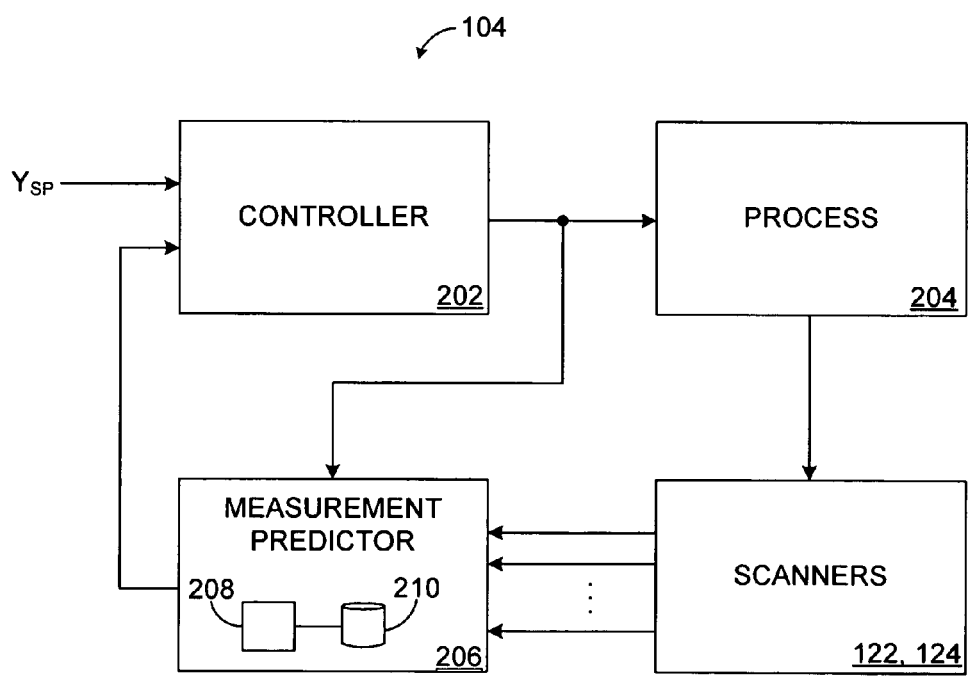
FIG. 2 illustrates an example control system in a paper production system according to one embodiment of this disclosure.

The control system 104 is coupled to the scanners 122-124. The control system 104 is capable of altering the operation of the paper machine 102 based on the measurements taken by the scanners 122-124. For example, the control system 104 could adjust the operation of the actuators 112-120 to achieve a desired result, such as a paper sheet 106 with desired or specified characteristics. The control system 104 includes any hardware, software, firmware, or combination thereof for controlling the operation of the paper machine 102. One example embodiment of the control system 104 is shown in FIG. 2, which is described below.

Among other things, the scanners 122-124 may not be synchronized with the control system 104. For example, the control system 104 may operate at a sampling rate, which could be fixed. In these embodiments, the control system 104 includes a measurement predictor that provides estimated measurements that are synchronized with the sampling rate of the control system 104. For example, the measurement predictor may predict the measurement data from one or more of the scanners 122-124 at the sampling instances (the times that the measurement data are sampled) of the control system 104. As a particular example, the measurement predictor may use a process model (such as a model of the paper machine's operation) and historical data (such as prior control signals generated by the control system 104) to estimate what the measurements from a sensor would likely be at the sampling instances of the controller. Later, when the sensor provides actual measurement data to the control system 104, the measurement predictor may update a prior predicted measurement using the new measurement data. The control system 104 may operate using the estimated and updated measurements. In this way, the control system 104 may operate using multiple sets of sensors, and the sets of sensors may be asynchronous (not synchronized with the control system 104). Moreover, the control system 104 could use the estimated and updated measurements in a synchronous manner, whether the samples are made at a fixed or variant sampling rate.

A network 105 is coupled to the control system 104, the actuators 112-120, and the scanners 122-124. The network 105 facilitates communication between components of system 100. For example, the network 105 may communicate Internet Protocol (IP) packets, frame relay frames, Asynchronous Transfer Mode (ATM) cells, or other suitable information between network addresses. The network 105 may include one or more local area networks (LANs), metropolitan area networks (MANs), wide area networks (WANs), all or a portion of a global network such as the Internet, or any other communication system or systems at one or more locations. The network 105 may also operate according to any appropriate type of protocol or protocols, such as Ethernet, IP, X.25, frame relay, or any other packet data protocol.

Although FIG. 1 illustrates one example of a paper production system 100, various changes may be made to FIG. 1. For example, other systems could be used to produce paper products or other products. Also, while shown as including two sets of sensors (scanners 122-124), the production system 100 could include more than two sets of sensors (whether scanning or stationary). In addition, the sensors could be located in any suitable locations in the system 100.

FIG. 2 illustrates an example control system 104 in a paper production system according to one embodiment of this disclosure. The control system 104 shown in FIG. 2 is for illustration only. Other embodiments of the control system 104 could be used without departing from the scope of this disclosure. Also, for ease of explanation, the control system 104 is described with respect to the paper production system 100 of FIG. 1. The control system 104 could be used with any other suitable device or system.

As shown in FIG. 2, the control system 104 includes a controller 202. The controller 202 is capable of controlling the operation of a process 204 (such as the process performed by the paper machine 102). For example, the controller 202 may receive inputs identifying the current value of a variable (such as a characteristic of the paper sheet 106). Based on the inputs, the controller 202 may adjust the operation of the process 204 so that the variable remains at or near a specified setpoint value ($Y_{SP}$). The controller 202 may perform these actions at a particular rate, such as when the controller 202 uses the predicted states/measurements and generates a corresponding output at a specified sampling rate. This rate defines an interval of time, which may be referred to as a "control interval." The controller 202 includes any hardware, software, firmware, or combination thereof for controlling one or more aspects of a process. The controller 202 could, for example, represent an output feedback controller or a state feedback controller. As particular examples, the controller 202 could represent a multivariable model predictive controller (such as a multivariable cross-direction model predictive controller), a proportional-integral-derivative controller, or an H-infinity controller.

The output of the controller 202 is provided to the process 204. In general, the process 204 represents a process that operates using the output of the controller 202, where the operation of the process 204 changes based on the controller output. In this example, the process 204 represents the paper machine 102 of the paper production system 100, where the controller 202 adjusts the operation of one or more components of the paper machine 102 to alter the production of a paper sheet 106.

The scanners 122-124 generate and provide measurement data based on the currently executing process 204. For example, the scanners 122-124 may represent sets of sensors that measure various characteristics of the paper sheet 106 being produced by the paper machine 102. The measurement data could represent synchronous or asynchronous data. For example, the scanners 122-124 could operate using different scanning times, meaning the scanners 122-124 require different amounts of time to generate measurement data. As another example, the scanners 122-124 could operate using identical but unaligned scanning times, meaning the scanners 122-124 require the same amount of time to generate measurement data but the time intervals are not aligned. Each of the scanners 122-124 may operate using any suitable scanning time, such as an interval of 10-30 seconds between measurements.

In these or other situations, the measurement data output by one or more of the scanners 122-124 may not be aligned or synchronized with the control interval of the controller 202. A measurement predictor 206 in the control system 104 is used to compensate for any asynchronous behavior of the scanners 122-124. For example, the measurement predictor 206 may be synchronized with the sampling rate of the controller 202. Using information such as a model of the process 204 and historical outputs from the controller 202, the measurement predictor 206 may predict the measurement data from one or more sensors, such as the sets of sensor in the scanners 122-124. This estimated measurement data may then be provided to the controller 202 for use. When a sensor provides actual measurement data to the measurement predictor 206, the measurement predictor 206 may update the prior predicted measurement data using the new measurement data from the sensor. In this way, the measurement predictor 206 allows measurement data from one or multiple asynchronous sensors to be provided to and used by the controller 202.

The measurement predictor 206 includes any hardware, software, firmware, or combination thereof for predicting at least some of the measurements made by one or more sensors. The measurement predictor 206 could, for example, include one or more processor 208 and one or more memories 210 capable of storing information and instructions used by the processor(s) 208. One example embodiment of the measurement predictor 206 is shown in FIG. 3, which is described below.

Although FIG. 2 illustrates one example of a control system 104 in a paper production system, various changes may be made to FIG. 2. For example, the control system 104 could include any number of controllers 202, processes 204, scanners 122-124, and measurement predictors 206.

Figure 3:
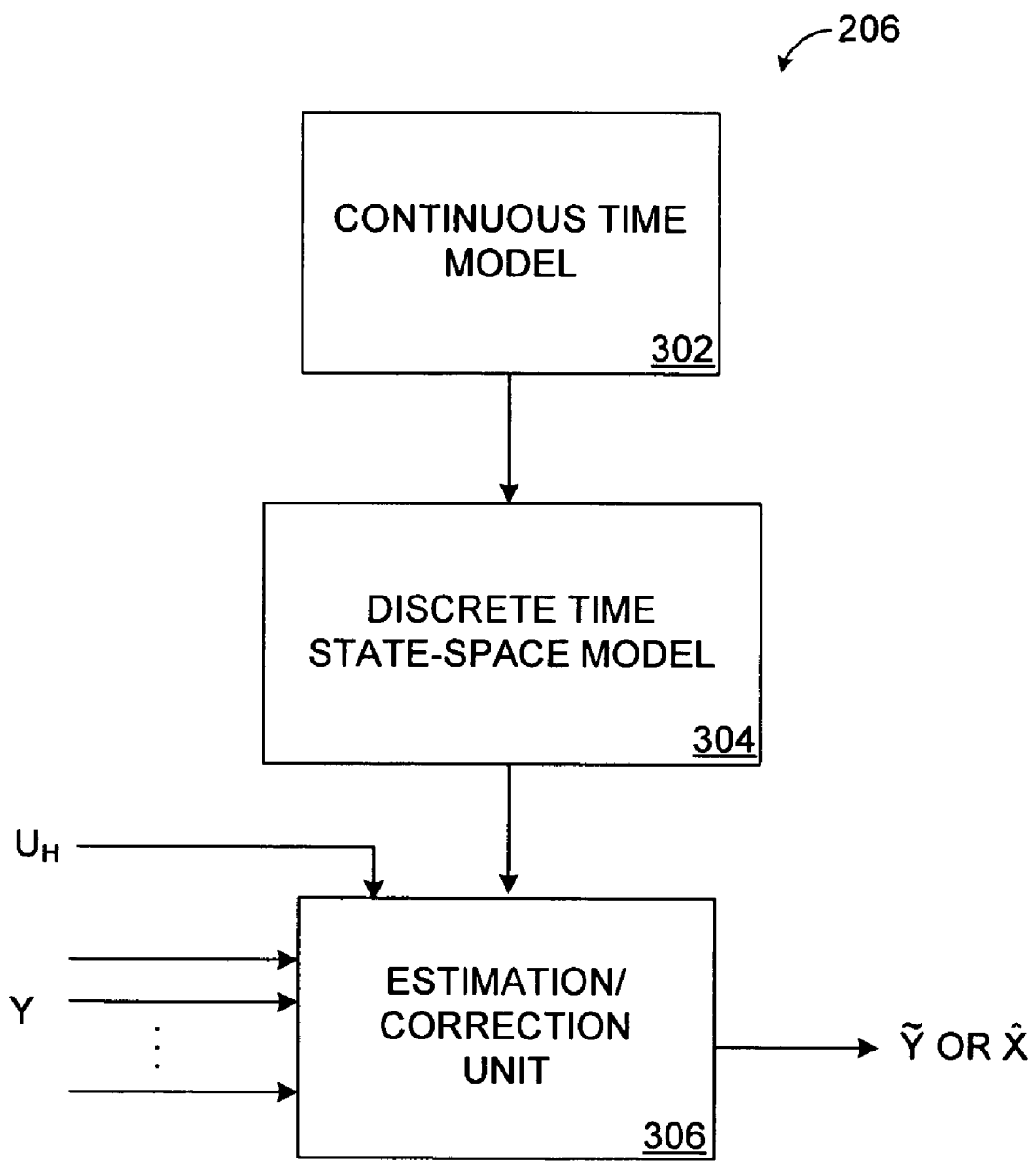
FIG. 3 illustrates an example measurement predictor in a control system according to one embodiment of this disclosure.

FIG. 3 illustrates an example measurement predictor 206 in a control system according to one embodiment of this disclosure. The embodiment of the measurement predictor 206 shown in FIG. 3 is for illustration only. Other embodiments of the measurement predictor 206 could be used without departing from the scope of this disclosure. Also, for ease of explanation, the measurement predictor 206 of FIG. 3 is described as operating in the control system 104 of FIG. 2 in the paper production system 100 of FIG. 1. The measurement predictor 206 could be used in any other suitable device or system.

As shown in FIG. 3, the measurement predictor 206 includes a continuous time model 302. The continuous time model 302 represents a mathematical model of the process 204 (which may represent the process implemented by the paper machine 102 of FIG. 1). The continuous time model 302 may, for example, mathematically represent the process 204 using a transfer function modeled in the continuous time domain.

The continuous time model 302 is used to define a discrete time state-space model 304 based on asynchronous sampling intervals. The discrete time state-space model 304 represents another mathematical model of the process 204. For example, the discrete time state-space model 304 may mathematically represent the process 204 using a transfer function model in the discrete time domain.

The measurement predictor 206 also includes an estimation/correction unit 306. The estimation/correction unit 306 may be used to estimate the measurement data from one or more sensors, such as the sets of sensors in the scanners 122-124. The estimation/correction unit 306 may also update or correct prior estimated measurement data using actual measurement data received from the sensors. In this example, the estimation/correction unit 306 may estimate measurement data from a sensor using the discrete time state-space model 304 and historical controller values $U_H$, which represent the prior control signals output by the controller 202 for controlling the process 204. The historical controller values $U_H$ could, for example, be stored in a buffer associated with the measurement predictor 206. In some embodiments, these values are used in conjunction with the discrete time state-space model 304 to estimate or predict one or more measurements ($\tilde{Y}$) from one or more sensors. The predicted measurements are then provided to the controller 202 (such as when the controller 202 is an output feedback controller). In other embodiments, the discrete time state-space model 304 could be used to estimate one or more states ($\tilde{X}$), which are provided to the controller 202 (such as when the controller is a state feedback controller). When measurement data from a sensor is received, the measurement predictor 206 may update the previously estimated measurements or states for that sensor. This allows the controller 202 to use the appropriate measurements or states when controlling the process 204.

In particular embodiments, the models 302-304 could be stored in the memory 210 and operated by the processor 208 of the measurement predictor 206. Also, the estimation/correction unit 306 could be executed by the processor 208 of the measurement predictor 206. Additional details regarding the operation of the measurement predictor 206 are shown in FIGS. 4, 5A, and 5B, which are described in more detail below.

Although FIG. 3 illustrates one example of a measurement predictor 206 in a control system, various changes may be made to FIG. 3. For example, other or additional components could be used in the measurement predictor 206 or to form the measurement predictor 206.

Figure 4:
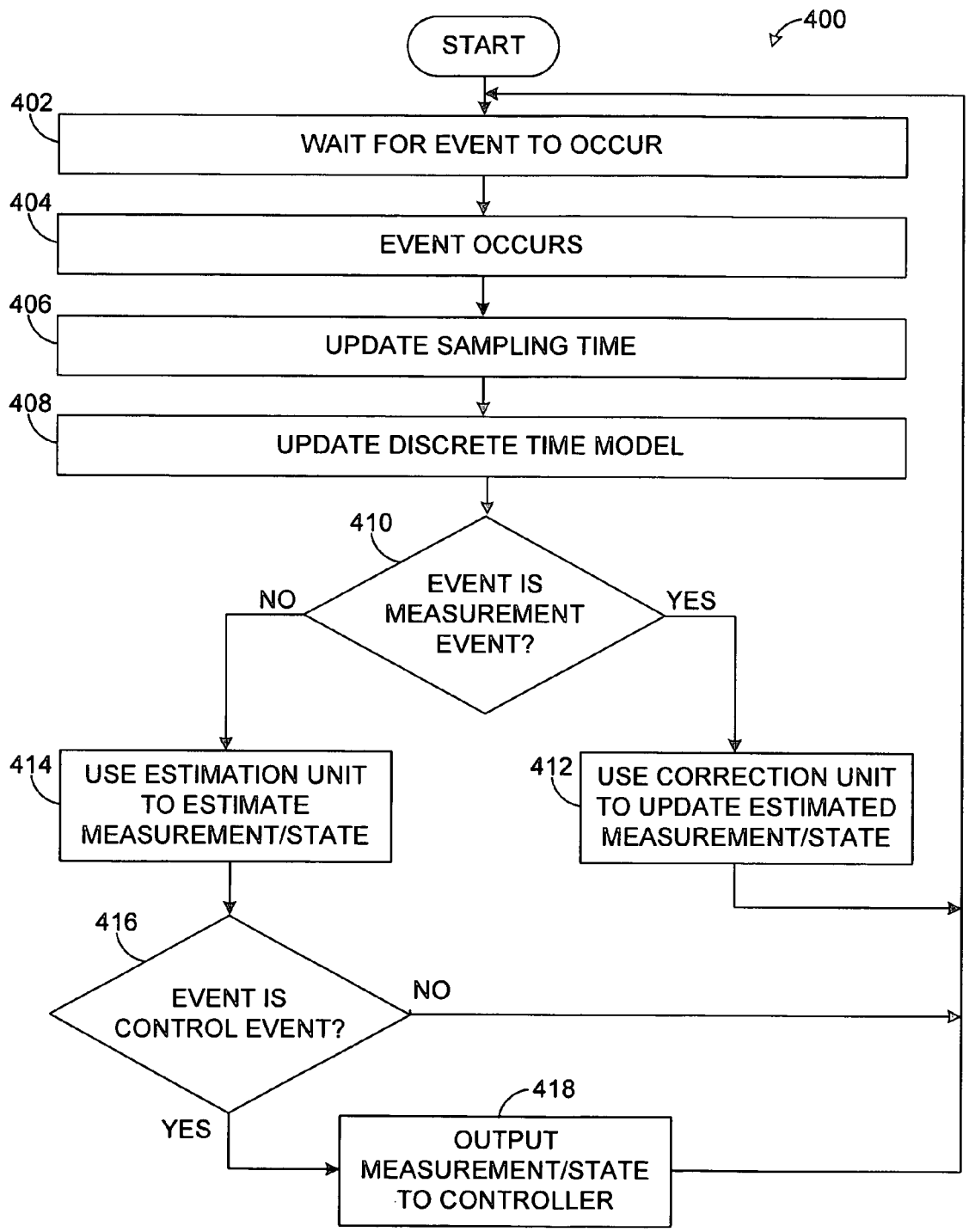
FIG. 4 illustrates an example method for controlling a paper machine or other machine using measurement predictions based on asynchronous sensor information according to one embodiment of this disclosure.
Figure 5A:
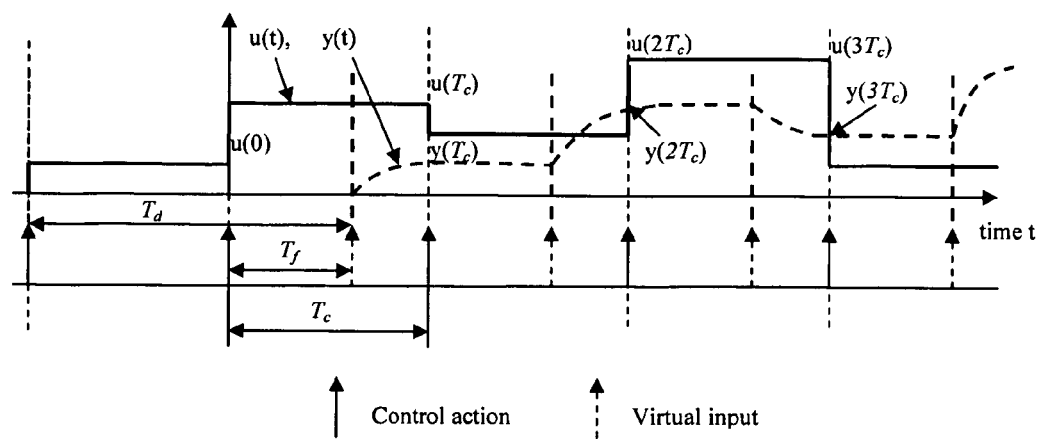
FIGS. 5A and 5B illustrate example operations of a measurement predictor according to one embodiment of this disclosure.
Figure 5B:
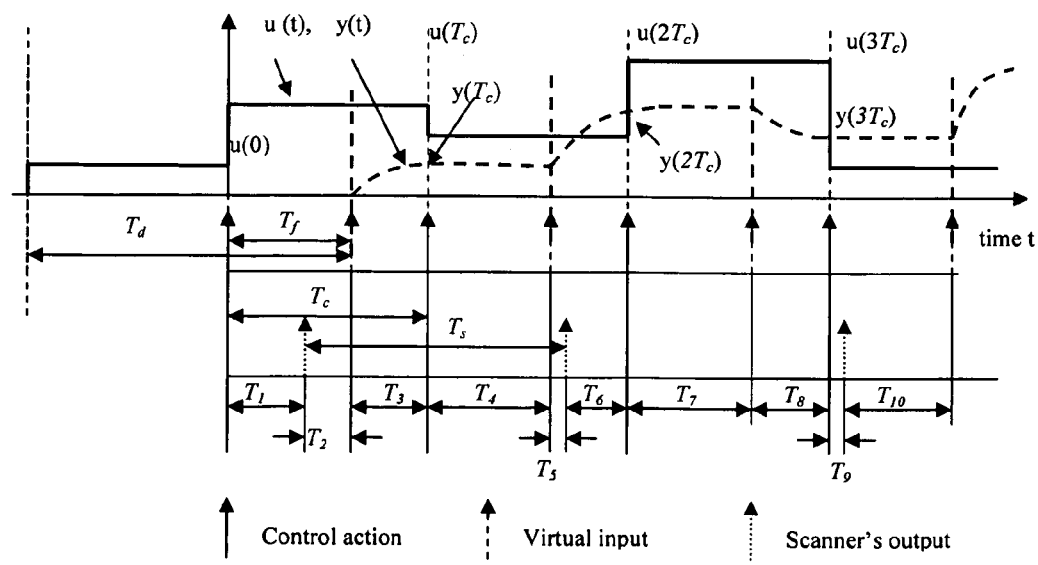

FIG. 4 illustrates an example method 400 for controlling a paper machine or other machine using measurement predictions based on asynchronous sensor information according to one embodiment of this disclosure. For ease of explanation, the method 400 is described with respect to the measurement predictor 206 in the control system 104 of FIG. 2 operating in the production system 100 of FIG. 1. The method 400 could be used by any other suitable device and in any other suitable system.

The measurement predictor 206 waits for an event to occur at step 402. This may include, for example, the measurement predictor 206 waiting for a measurement event (such as receipt of measurement data from a sensor or set of sensors) or waiting for a controller execution event (use of measurement data by a controller). An event then occurs at step 404. This may include, for example, the measurement predictor 206 receiving measurement data from a sensor or set of sensors.

The measurement predictor 206 updates the current sampling time of the sensor(s) at step 406 and updates a discrete time model at step 408. This may include, for example, the measurement predictor 206 using the continuous time model 302 to generate the discrete time state-space model 304.

If the event that occurs is a measurement event at step 410, the measurement predictor 206 uses a correction unit to update a prior estimated measurement or state using actual measurement data at step 412. This may include, for example, the estimation/correction unit 306 using the actual measurement data from a sensor to correct a prior estimated measurement or state. The measurement predictor 206 may then return to step 402. In other embodiments, if the measurement event coincides with a controller execution event, the measurement predictor 206 outputs the corrected measurement data to the controller at steps 416-418. The controller 202 may then operate using the corrected measurement data to control the process 204.

If the event that occurs is not a measurement event at step 410, the measurement predictor 206 uses an estimation unit to estimate a measurement or state at step 414. This may include, for example, the estimation/correction unit 306 using the updated discrete time state-space model 304 and historical controller values $U_H$ to predict what the measurement data from the sensor(s) might be. If the event is a controller execution event at step 416, the measurement predictor 206 outputs the predicted measurement data to the controller at step 418. The controller 202 may then operate using the predicted measurement data to control the process 204.

If the event that occurs is a measurement event at step 410, the measurement predictor 206 uses a correction unit to update a prior estimated measurement or state using actual measurement data at step 414. This may include, for example, the estimation/correction unit 306 using the actual measurement data from a sensor to correct a prior estimated measurement or state. If the measurement event coincides with the controller execution event, the measurement predictor 206 outputs the corrected measurement data to the controller at step 416. The controller 202 may then operate using the corrected measurement data to control the process 204.

In this way, the measurement predictor 206 may provide estimated and updated measurement data to the controller 202 as needed. This flexibility allows the measurement predictor 206 to provide measurement data from scanners 122-124 to the controller 202, even when the scanners 122-124 are asynchronous compared to the controller 202.

Although FIG. 4 illustrates one example of a method 400 for controlling a paper machine or other machine using measurement predictions based on asynchronous sensor information, various changes may be made to FIG. 4. For example, the measurement predictor 206 may use the method 400 of FIG. 4 to process data from any number of scanners or sensors.

Returning to FIG. 3, the following represents additional details regarding one specific implementation of the measurement predictor 206 that operates according to the method 400 of FIG. 4. The additional details that follow are for illustration and explanation only. Other embodiments of the measurement predictor 206 could be used without departing from the scope of this disclosure.

In particular embodiments, the following transfer function model in the continuous time domain may be used as the continuous time model 302:

$$\begin{bmatrix} Y_1(s) \\ \vdots \\ Y_{N_y}(s) \end{bmatrix} = \underbrace{\begin{bmatrix} G_{11} \cdot h_{11}(s) & \cdots & G_{1N_u} \cdot h_{1N_u}(s) \\ \vdots & \ddots & \vdots \\ G_{N_y1} \cdot h_{N_y1}(s) & \cdots & G_{N_yN_u} \cdot h_{N_yN_u}(s) \end{bmatrix}}_{G_h(s)} \underbrace{\begin{bmatrix} U_1(s) \\ \vdots \\ U_{N_u}(s) \end{bmatrix}}_{U(s)} + \underbrace{\begin{bmatrix} D_1(s) \\ \vdots \\ D_{N_y}(s) \end{bmatrix}}_{D(s)}. \quad (1)$$

In this particular model 302, $Y(s) \in \mathscr{C}^{N_y m \times 1}$, $$U(s) \in \mathscr{C}^{\sum_{j=1}^{N_u} n_j \times 1},$$

and $D(s) \in \mathscr{C}^{N_y m \times 1}$ represent measurement profiles, actuator profiles, and disturbance profiles, respectively. The measurement profiles represent the present or current values of measurement data from a set of sensors. The actuator profiles represent the present or current values of control signals output by the controller 202 to actuator arrays in the process 204 (such as components 110-120 in the paper machine 102). The disturbance profiles represent the present or current values of disturbances in the process 204, which represent unpredictable or random fluctuations in the process 204. Also, $N_y$ and $N_u$ represent the number of properties measured by the sensors and the number of actuator arrays, respectively. Further, m represents the resolution of the sensors, and $n_j$ represents the number of actuators in the $j^{th}$ actuator array. Although different sensors (such as scanners from different vendors) may have different resolutions, it is typically possible to up-sample or down-sample measurements so that all sensors have a common resolution. The common resolution could, for example, be at least three times the largest actuator number in all actuator arrays. Beyond that, $G_{ij} \in C^{m \times n_j}$ (where $i=1, \ldots, N_y$ and $j=1, \ldots, N_u$) represents the $ij^{th}$ subplant's spatial matrix response, where a subplant represents a portion of the process 204 monitored by one or more sensor arrays. In addition, $h_{ij}(s)$ represents the $ij^{th}$ subplant's dynamical response, which may be defined as:

$$h_{ij}(s) = \frac{e^{-T_{dij}s}}{1 + T_{pij}s}. \quad (2)$$

In this dynamical response, $T_{dij}$ and $T_{pij}$ are the $ij^{th}$ subplant's time delay and time constant (in seconds), respectively. The subplants' dynamics may be of different orders than that shown in Equation (2).

Based on Equation (2), the $ij^{th}$ subplant's transfer function can be expressed in the following state-space format:

$$\dot{X}_{ij}(t) = A_{ij}^c X_{ij}(t) + B_{ij}^c U_j(t - T_{dij}), \text{ and} \quad (3)$$

$$Y_i(t) = \sum_{j=1}^{N_u} C_{ij}^c X_{ij}(t) + D_i(t), \quad (4)$$

where:

-continued $$A_{ij}^c = -\frac{1}{T_{pij}} I_{m \times m} \in \mathscr{R}^{m \times m}, \quad (5)$$

$$B_{ij}^c = \frac{1}{T_{pij}} G_{ij} \in \mathscr{R}^{m \times n_j}, \text{ and} \quad (6)$$

$$C_{ij}^c = I_{m \times m}. \quad (7)$$

In this particular transfer function, $i=1, \ldots, N_y, j=1, \ldots, N_u$, and $I_{m \times m}$ represents an m-by-m identity matrix. The value of c in the matrices $A_{ij}^c$, $B_{ij}^c$, and $C_{ij}^c$ refers to state-space in the continuous time domain, and the time delay $T_{dij}$ is in seconds. The matrices $A_{ij}^c$, $B_{ij}^c$, and $C_{ij}^c$ may take different forms when the subplants' dynamics are different from the example given in Equation (2).

If the discrete time state-space model 304 is based on a fixed control interval $T_c$ (which could equal an integer multiple of a scanning/sampling time $T_s$ of a sensor), the discrete time state-space model 304 could be defined as follows:

$$X_{ij}(k+1) = A_{ij} X_{ij}(k) + B_{ij} U_j(k - t_{dij}), \text{ and} \quad (8)$$

$$Y_i(k) = \sum_{j=1}^{N_u} C_{ij} X_{ij}(k) + D_i(k), \quad (9)$$

where:

$$A_{ij} = e^{-\frac{T_c}{T_{pij}}} I_{m \times m}, \quad (10)$$

$$B_{ij} = \left(1 - e^{-\frac{T_c}{T_{pij}}}\right) G_{ij}, \quad (11)$$

$$C_{ij} = I_{m \times m}, \text{ and} \quad (12)$$

$$t_{dij} = \text{floor}\left(\frac{T_{dij}}{T_c}\right) \quad (13)$$

where the function floor(x) returns the integer portion of x (such as by using a MATLAB command that rounds the value of x to the nearest integer towards minus infinity). This discrete time representation allows the discrete time state-space model 304 to accurately predict a measurement or state for non-integer time delay systems (such as systems having asynchronous sensors).

Given these models and measurements from the sensors 122-124, the measurement predictor 206 operates to accurately predict the measurement profiles for one or more sensors based on real measurements from the sensors. Moreover, the measurement predictor 206 could be implemented in such a way as to reduce or minimize changes needed to the controller 202, which may help to reduce the costs associated with using the measurement predictor 206 in legacy control systems.

The following describes how support for multiple asynchronous sensors may be incorporated into the control system 104 using the measurement predictor 206. The solution described below is divided into three sections. The first describes how to accurately predict measurements in the discrete time domain for a single-input, single-output system (a system with one sensor and a controller controlling one actuator). The second describes how the estimation/correction unit 306 may be used in the measurement predictor 206. The third describes how to expand the above techniques into multi-dimensional systems (systems with multiple sensor arrays).

In general, predicted measurements can be accurately obtained based on the continuous model from Equations (3) and (4) since the time delay $T_d$ can be any positive number. However, in the discrete time domain, the quotient $$\frac{T_d}{T_c}$$

is often a non-integer value, and measurements often cannot be accurately predicted based on the fixed sampling state-space model of Equation (8) without increasing the order of the system. For example, FIG. 5A illustrates the use of a fixed control interval $T_c$ and time delay $T_d$ in a system, where $T_d = pT_c + T_f$, p represents the non-negative integer portion of the quotient $$\frac{T_d}{T_c},$$

and $T_f$ represents the fraction portion of the quotient $$\frac{T_d}{T_c}.$$

The system associated with FIG. 5A is a single-input, single-output system, where $$y(t) = K_p\left(1 - e^{-\frac{1}{T_p}t}\right)u(t - T_d),$$

$u(t-T_d)$ is a stepwise constant controller signal, and $K_p$ is the process gain.

FIG. 5A shows how to handle the fractional time delay. In the example shown in FIG. 5A, the time delay $T_d$ is greater than the fixed control interval $T_c$. More specifically, the time delay $T_d$ represents the sum of one complete fixed control interval $T_c$ plus a fraction $T_f$ of another fixed control interval. In this example, the function u(t) can be modified by defining $u_1(t)=u(t+pT_c)$ to represent the integer portion of the time delay $T_d$ and by defining a virtual input $v(t)=u_1(t+T_f)$ to represent the fractional portion of the time delay $T_d$. By using the virtual input, there is no delay between the output y(t) and the virtual input v(t), meaning $$y(t) = K_p\left(1 - e^{-\frac{1}{T_p}t}\right)v(t).$$

It is possible to express the dynamical response of the system represented in FIG. 5A using the following state-space model in the continuous time domain:

$$\dot{x}(t) = a^c x(t) + b^c u(t-T_d), \text{ and} \tag{14}$$

$$y(t) = c^c x(t) + d(t), \tag{15}$$

where:

$$a^c = -\frac{1}{T_p}, \tag{16}$$

$$b^c = \frac{K_p}{T_p}, \tag{17}$$

$$c^c = 1, \text{ and} \tag{18}$$

$$T_d = pT_c + T_f. \tag{19}$$

The measurement y(t) at time t (where $t=n \times T_c$, n=1, 2, . . . ) can be accurately predicted as follows. Equations (14) and (15) in the continuous time domain are converted into the discrete time domain with a sampling time $T_f$. The states can then be calculated, such as by:

$$x(t) = a^{d1} x(t-T_f) + b^{d1} u(nT_c - pT_c - T_c) \tag{20}$$

at times $t=nT_c+T_f$ (n=0, 1, 2, . . . ), where $$a^{d1} = e^{-\frac{T_f}{T_p}} \text{ and } b^{d1} = K_p\left(1 - e^{-\frac{T_f}{T_p}}\right).$$

The continuous time t is used instead of the discrete time k because of the variant sampling times of the sensors. Equations (14) and (15) are again converted into the discrete time domain with a different sampling time ($T_c-T_f$), and the measurements y(t) are estimated at times $t=n \times T_c$. For example, this may take the form:

$$x(t) = a^{d2} x(t-T_c+T_f) + b^{d2} u(t-pT_c-T_c), \text{ and} \tag{21}$$

$$y(t) = c^{d2} x(t) + d(t), \tag{22}$$

at times $t=n \times T_c$ (n=1, 2, . . . ), where $$a^{d2} = e^{-\frac{T_c-T_f}{T_p}}, b^{d2} = K_p\left(1 - e^{-\frac{T_c-T_f}{T_p}}\right),$$

and $c^{d2}=1$. In this example, the matrices $a^{d1}$, $a^{d2}$, $b^{d1}$, and $b^{d2}$ in the discrete time domain are functions of the sampling times as illustrated in Equations (10) and (11). Also, Equation (20) is used to propagate the states from times $t=n \times T_c$ to times $t=n \times T_c + T_f$, and Equation (21) is used to propagate the states from times $t=n \times T_c + T_f$ to times $t=(n+1) \times T_c$. In particular embodiments, if a system is modeled in the continuous time domain, the system's state-space model in the discrete time domain with variant sampling time can be determined, and its discrete outputs can be accurately predicted without any error.

The single-input, single-output system represented in FIG. 5A could be extended to multiple-input, multiple-output systems. For example, the states for each subplant in a multiple-input, multiple-output system can be updated separately, and all subplants could be updated at the control action time. In other words, the states and measurements are updated using a variant sampling time $T_1$ (equal to $T_f$ or $T_c - T_f$), such as:

$$x_{ij}(t) = a_{ij}^d x_{ij}(t-T_1) + b_{ij}^d u_j(t - p_{ij}T_c - T_c), \text{ and} \quad (23)$$

$$y_i(t) = \sum_{j=1}^{N_u} c_{ij}^d x_{ij}(t) + d_i(t), \quad (24)$$

at times $t=n \times T_c$ ($n=1, 2, \ldots$).

This has described how to accurately predict measurements in the discrete time domain for a single-input, single-output system. The following describes how the estimation/correction unit 306 may be used in the measurement predictor 206. As noted above, one or more of the scanners 122-124 may not be synchronized with the controller 202, and the measurement predictor 206 may predict the outputs of the scanners 122-124 and provide the predicted values to the controller 202. The estimation/correction unit 306 then updates or corrects the predicted values when actual measurements from the scanners 122-124 are received. FIG. 5B illustrates how the technique shown in FIG. 5A is extended to handle the situation where the control action is not synchronized with a sensor's outputs.

As shown in FIG. 5B, during the fixed control interval $T_c$, several different things could occur. A virtual input (which is the controller output delayed by the particular time delay for each subplant, where the time period between a virtual input event and a controller action event is the fractional time delay of a subplant) and one or more sensor outputs could be received. In particular embodiments, multiple sensor outputs could be received, but only the latest or most recent one is relevant. The virtual input could occur earlier than the sensor output, at the same time as the sensor output, or after the sensor output. As shown in FIG. 5B, each fixed control interval $T_c$ is divided into two or three portions, depending on when the virtual input and sensor output occur. These times are used as variant sampling times and for predicting the states and measurements as described above. However, when the sensor output occurs, the states may be corrected by the estimation/correction unit 306 using the new measurements. For example, the estimation/correction unit 306 may operate to implement the following:

$$\hat{x}_{ij}(t|t) = \hat{x}_{ij}(t) + L \times (y_{im}(t) - \hat{y}_i(t)), \quad (25)$$

where $\hat{x}_{ij}(t|t)$ represents the states after correction based on the measurements $y_{im}(t)$ from the sensor, L represents the correction unit's gain (may be equal to $1/N_u$), and $\hat{x}_{ij}(t)$ and $\hat{y}_i(t)$ represent the predicted states and measurements. The correction in Equation (25) may occur when an output from the sensor is received by the estimation/correction unit 306 (such as at the end of times $T_1$, $T_5$, and $T_9$ in FIG. 5B). Also, the states $\hat{x}_{ij}(t)$ may be replaced by the corrected states $\hat{x}_{ij}(t|t)$ (such as at the beginning of times $T_2$, $T_6$, and $T_{10}$ in FIG. 5B). In particular embodiments, the predicted measurements may only be updated when a control action event occurs.

As a particular example, the measurements at time $t=T_c$ may be predicted as follows. Equations (14) and (15) are converted from the continuous time domain to the discrete time domain with a sampling time $T_1$. The measurement at time $t=T_1$ can be predicted as:

$$x(t) = a^{d1}x(t-T_1) + b^{d1}u(t-pT_c-T_c), \text{ and} \quad (26)$$

$$y(t) = c^{d1}x(t) + d(t), \quad (27)$$

where $t=T_1$. The states are then corrected using Equation (25). Equations (14) and (15) are converted from the continuous time domain to the discrete time domain again with a sampling time $T_2$, such as by:

$$x(t) = a^{d2}x(t-T_2) + b^{d2}u(t-pT_c-T_c), \quad (28)$$

where $t=T_1+T_2$. Equations (14) and (15) are again converted from the continuous time domain to the discrete time domain with a sampling time $T_3$, such as by:

$$x(t) = a^{d3}x(t-T_3) + b^{d3}u(t-pT_c-T_c), \text{ and} \quad (29)$$

$$y(t) = c^{d3}x(t) + d(t), \quad (30)$$

where $t=T_c$. Finally, the predicted states/measurements at $t=T_c$ are outputted to the controller 202. A similar process could be used to predict the measurements at times $t=2T_c$, $3T_c$, .... A similar process could also be used with multiple-input, multiple-output systems having multiple asynchronous sensors.

Finally, the above techniques may be expanded for use in multi-dimensional systems with multiple sensor arrays. For example, the scalar input u and scalar output y may be replaced with a vector input U and a vector output Y, respectively. Accurately predicting the measurements at time $t=T_c$ could occur as follows. Equations (3) and (4) are converted from the continuous time domain to the discrete time domain with a sampling time $T_1$. The measurements at time $t=T_1$ can be predicted as:

$$X_{ij}(t) = A_{ij}^{d1} X_{ij}(t-T_1) + B_{ij}^{d1} U_j(t - p_{ij}T_c - T_c), \text{ and} \quad (31)$$

$$Y_i(t) = \sum_{j=1}^{N_u} C_{ij}^{d1} X_{ij}(t) + D_i(t), \quad (32)$$

at time $t=T_1$, where:

$$A_{ij}^{d1} = a_{ij}^{d1} I_{m \times m} = e^{-\frac{T_1}{T_{pij}}} I_{m \times m}, \quad (33)$$

$$B_{ij}^{d1} = b_{ij}^{d1} G_{ij} = \left(I - e^{-\frac{T_1}{T_{pij}}}\right) G_{ij}, \quad (34)$$

$$C_{ij}^{d1} = I_{m \times m}, \text{ and} \quad (35)$$

$$U_j \in \mathscr{R}^{n_j \times 1}, Y_i, D_i \in \mathscr{R}^{m \times 1}. \quad (36)$$

The states are corrected and updated at time $t=T_1$, such as:

$$\hat{X}_{ij}(t|t) = X_{ij}(t) + L \times (Y_{im}(t) - Y_i(t)), \text{ and} \quad (37)$$

$$X_{ij}(t) = \hat{X}_{ij}(t|t). \quad (38)$$

Equation (3) is again converted from the continuous time domain to the discrete time domain with a sampling time $T_2$, such as by:

$$X_{ij}(t) = A_{ij}^{d2} X_{ij}(t-T_2) + B_{ij}^{d2} U_j(t-p_{ij}T_c-T_c), \quad (39)$$

at time $t=T_1+T_2$, where:

$$A_{ij}^{d2} = e^{-\frac{T_2}{T_{pij}}} I_{m \times m}, \quad (40)$$

-continued $$B_{ij}^{d2} = \left(1 - e^{-\frac{T_2}{T_{pij}}}\right) G_{ij}, \quad (41)$$

$$C_{ij}^{d2} = I_{m \times m}, \text{ and} \quad (42)$$

$$U_j \in \mathscr{C}^{n_j \times 1}, X_{ij} \in \mathscr{C}^{m \times 1}. \quad (43)$$

Equations (3) and (4) are yet again converted from the continuous time domain to the discrete time domain with a sampling time $T_c$. The measurement at time $t=T_c$ can be predicted as:

$$X_{ij}(t) = A_{ij}^{d3} X_{ij}(t - T_3) + B_{ij}^{d3} U_j(t - p_{ij}T_c - T_c), \text{ and} \quad (44)$$

$$Y_i(t) = \sum_{j=1}^{N_u} C_{ij}^{d3} X_{ij}(t) + D_i(t), \quad (45)$$

at time $t=T_1$, where:

$$A_{ij}^{d3} = e^{-\frac{T_3}{T_{pij}}} I_{m \times m}, \quad (46)$$

$$B_{ij}^{d3} = \left(1 - e^{-\frac{T_3}{T_{pij}}}\right) G_{ij}, \quad (47)$$

$$C_{ij}^{d3} = I_{m \times m}, \text{ and} \quad (48)$$

$$U_j \in \mathscr{C}^{n_j \times 1}, Y_i, D_i \in \mathscr{C}^{m \times 1}. \quad (49)$$

In this way, the technique described above can be used in systems having multiple sensor arrays, at least one of which is asynchronous (compared to the control interval of the controller 202).

The preceding description has described one particular implementation of the measurement predictor 206 in the control system 104 of FIG. 2 operating with the paper machine 102 of FIG. 1. Other embodiments of the measurement predictor 206 and the control system 104 could operate in other or additional ways without departing from the scope of this disclosure. Also, the measurement predictor 206 could operate to control other devices instead of or in addition to the paper machine 102.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
    generating multiple discrete time models of a process to be controlled using a continuous time model of the process;
    predicting measurements or states to be used by a controller to control the process, the predicted measurements or states generated using the discrete time models of the process;
    providing the predicted measurements or states to the controller such that the controller uses the predicted measurements or states at a sampling rate of the controller; and
    updating at least some of the predicted measurements or states using measurements associated with a characteristic of an item from a sensor;
    wherein the discrete time models are associated with multiple sampling times, wherein different sampling times are associated with different types of events and each discrete time model being associated with at least one event not associated with any other discrete time model.

2. The method of claim 1, wherein:
    the controller has a control interval $T_c$;
    the process to be controlled has a time delay $T_d$ that is larger than the control interval $T_c$ such that $T_d = pT_c T_f$, where p is a positive integer and $T_f$ represents an amount of time in a fractional portion of one control interval $T_c$ within the time delay $T_d$; and
    the types of events comprise:
        reaching a start or an end of a current control interval $T_c$;
        receiving one of the measurements from the sensor; and
        reaching a time equal to the start of the current control interval $T_c$ plus the amount of time $T_f$ 3. The method of claim 1, wherein the measurements are received from a plurality of sensors, at least two of the sensors having different sampling times for generating their measurements.

4. The method of claim 3, further comprising:
    at least one of up-sampling and down-sampling the measurements from at least one of the plurality of sensors so that all sensors have a common resolution, the resolution at least three times a largest number of actuators in a plurality of actuator arrays in the process.

5. The method of claim 1, further comprising:
    sampling the predicted measurements or states at the controller; and generating control signals for controlling the process using the sampled measurements or states; and wherein predicting the measurements or states comprises generating at least some of the predicted measurements or states using at least one of the models and the model and at least some of the control signals.

6. The method of claim 5, wherein the sampling rate of the controller comprises a variant sampling rate.

7. The method of claim 1, wherein:
the process comprises a paper production process;
the controller comprises a multivariable cross-direction model predictive controller; and
the sensor comprises a plurality of sensor arrays operable to measure at least one of: weight, moisture, caliper, gloss, and smoothness of paper produced by the paper production process.

8. The method of claim 7, wherein each sensor array comprises one of: a scanning sensor array and a stationary sensor array.

9. The method of claim 1, wherein a time interval between measurements output by the sensor is not an integer multiple of a time interval between outputs of the controller.

10. An apparatus, comprising:
at least one memory operable to store a continuous time model representing a process controlled by a controller; and
at least one processor operable to:
generate multiple discrete time models of the process using the continuous time model;
predict measurements or states to be used by the controller to control the process, the predicted measurements or states generated using the discrete time models;
provide the predicted measurements or states to the controller such that the controller uses the predicted measurements or states at a sampling rate of the controller; and
update at least some of the predicted measurements or states using measurements associated with a characteristic of an item from a sensor;
wherein the discrete time models are associated with multiple sampling times, wherein different sampling times are associated with different types of events and each discrete time model being associated with at least one event not associated with any other discrete time model.

11. The apparatus of claim 10, wherein:
the controller has a control interval $T_c$;
the process to be controlled has a time delay $T_d$ that is larger than the control interval $T_c$ such that $T_d = pT_c + T_f$, where p is a positive integer and $T_f$ represents an amount of time in a fractional portion of one control interval $T_c$ within the time delay $T_d$; and
the types of events comprise:
reaching a start or an end of a current control interval $T_c$;
receiving one of the measurements from the sensor; and
reaching a time equal to the start of the current control interval $T_c$ plus the amount of time $T_f$.

12. The apparatus of claim 10, further comprising:
a plurality of sensors, at least two of the sensors having different sampling times for generating their measurements.

13. The apparatus of claim 12, wherein the at least one processor is further operable to at least one of up-sample and down-sample the measurements from at least one of the plurality of sensors so that all sensors have a common resolution, the resolution at least three times a largest number of actuators in a plurality of actuator arrays in the process.

14. The apparatus of claim 10, wherein:
the controller is operable to use the predicted measurements or states and generate control signals for controlling the process using sampled predicted measurements or states; and
the at least one processor is operable to predict the measurements or states by generating at least some of the predicted measurements or states using at least one of the models and at least some of the control signals.

15. The apparatus of claim 14, wherein the sampling rate of the controller comprises a variant sampling rate.

16. The apparatus of claim 10, wherein:
the process comprises a paper production process;
the controller comprises a multivariable cross-direction model predictive controller; and
the sensor comprises a plurality of sensor arrays operable to measure at least one of: weight, moisture, caliper, gloss, and smoothness of paper produced by the paper production process.

17. The apparatus of claim 10, wherein a time interval between measurements output by the sensor is not an integer multiple of a time interval between outputs of the controller.

18. A computer readable medium embodying a computer program, the computer program comprising computer readable program code for:
generating multiple discrete time models of a process to be controlled using a continuous time model of the process;
predicting measurements or states to be used by a controller to control the process, the predicted measurements or states generated using the discrete time models of the process;
providing the predicted measurements or states to the controller such that the controller uses the predicted measurements or states at a sampling rate of the controller; and
updating at least some of the predicted measurements or states using measurements associated with a characteristic of an item from a sensor;
wherein the discrete time models are associated with multiple sampling times, and wherein different sampling times are associated with different types of events and each discrete time model being associated with at least one event not associated with any other discrete time model.

19. The computer readable medium of claim 18, wherein:
the controller has a control interval $T_c$;
the process to be controlled has a time delay $T_d$ that is larger than the control interval $T_c$ such that $T_d = pT_c + T_f$, where p is a positive integer and $T_f$ represents an amount of time in a fractional portion of one control interval $T_c$ within the time delay $T_d$; and
the types of events comprise:
reaching a start or an end of a current control interval $T_c$;
receiving one of the measurements from the sensor; and
reaching a time equal to the start of the current control interval $T_c$ plus the amount of time $T_f$.

20. The computer readable medium of claim 18, wherein the measurements are received from a plurality of sensors, at least two of the sensors having different sampling times for generating their measurements.

21. The computer readable medium of claim 18, wherein the sampling rate of the controller comprises a variant sampling rate.

22. The computer readable medium of claim 18, wherein:
the controller is operable to use the predicted measurements or states and generate control signals for controlling the process using sampled predicted measurements or states; and
the computer readable program code for predicting the measurements or states comprises computer readable program code for generating at least some of the predicted measurements or states using at least one of the models and at least some of the control signals.

23. The computer readable medium of claim 18, wherein:
the process comprises a paper production process;
the controller comprises a multivariable cross-direction model predictive controller; and
the sensor comprises a plurality of sensor arrays operable to measure at least one of: weight, moisture, caliper, gloss, and smoothness of paper produced by the paper production process.

24. The computer readable medium of claim 18, wherein a time interval between measurements output by the sensor is not an integer multiple of a time interval between outputs of the controller.

* * * * *